Plate 1

2 Sheets--Sheet 1.

B. D. GULLETT.

Cotton-Gins.

No. 6,034.

Reissued Sept. 1, 1874.

Witnesses.
J. Martin Jr.
Chas. B. Wittington

Inventor.
Benjamin D. Gullett
by his Attorneys
Mason Fenwick & Lawrence

Plate 2.

2 Sheets--Sheet 2.

B. D. GULLETT.

Cotton-Gins.

No. 6,034.

Reissued Sept. 1, 1874.

Witnesses:
J. Martin Jr.
Chas. B. Wittington

Inventor:
Benjamin D. Gullett
by his Attorneys
Mason Fenwick & Lawrence

UNITED STATES PATENT OFFICE.

BENJAMIN D. GULLETT, OF AMITE CITY, LOUISIANA, ASSIGNOR TO THE GULLETT GIN MANUFACTURING COMPANY, OF SAME PLACE.

IMPROVEMENT IN COTTON-GINS.

Specification forming part of Letters Patent No. 140,365, dated July 1, 1873; reissue No. 6,034, dated September 1, 1874; application filed February 26, 1874.

DIVISION A.

*To all whom it may concern:*

Be it known that I, BENJAMIN D. GULLETT, of Amite City, in the parish of Tangipahoa and State of Louisiana, have invented certain new and useful Improvements in Gins for Ginning Cotton; and I do hereby declare that the following is a full, clear, and exact description thereof, reference being had to the accompanying drawings making part of this specification, in which—

Figure 1:
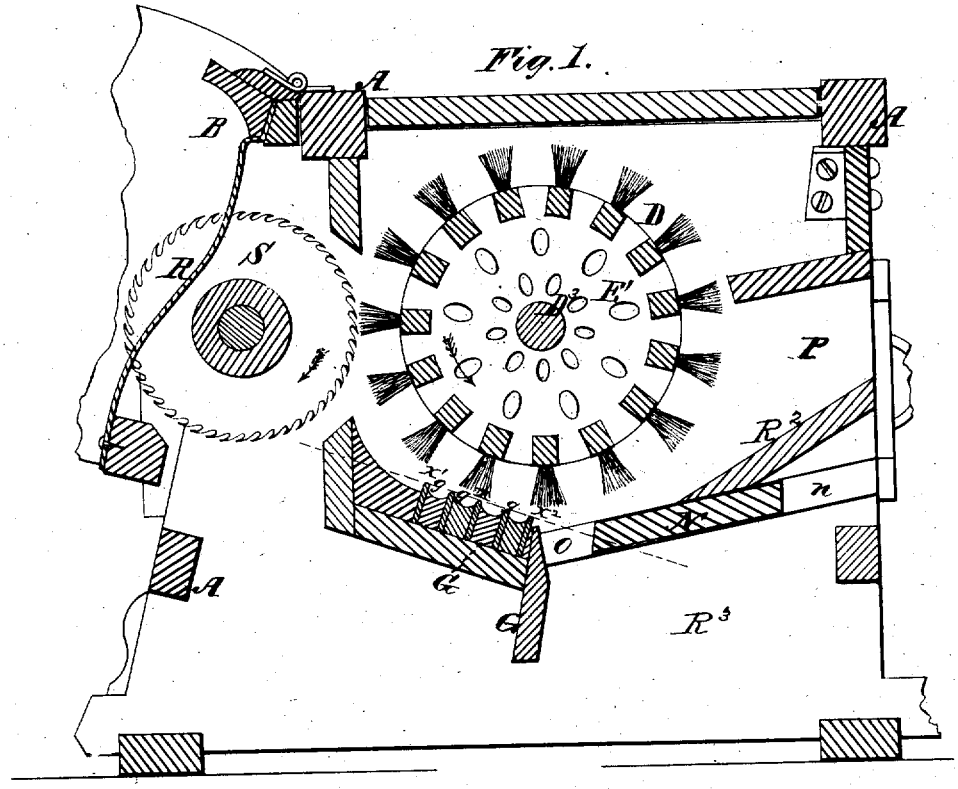
Figure 2:
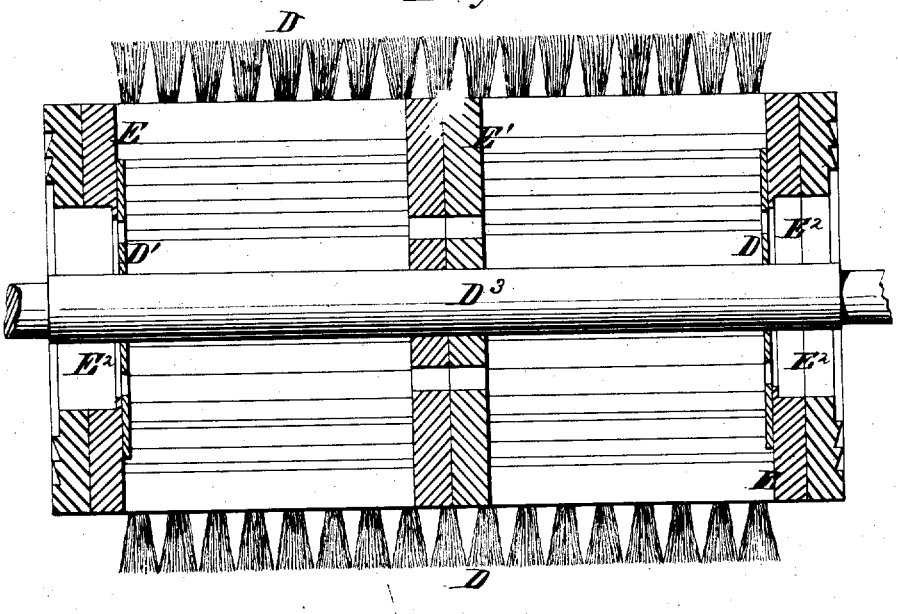
Figure 3:
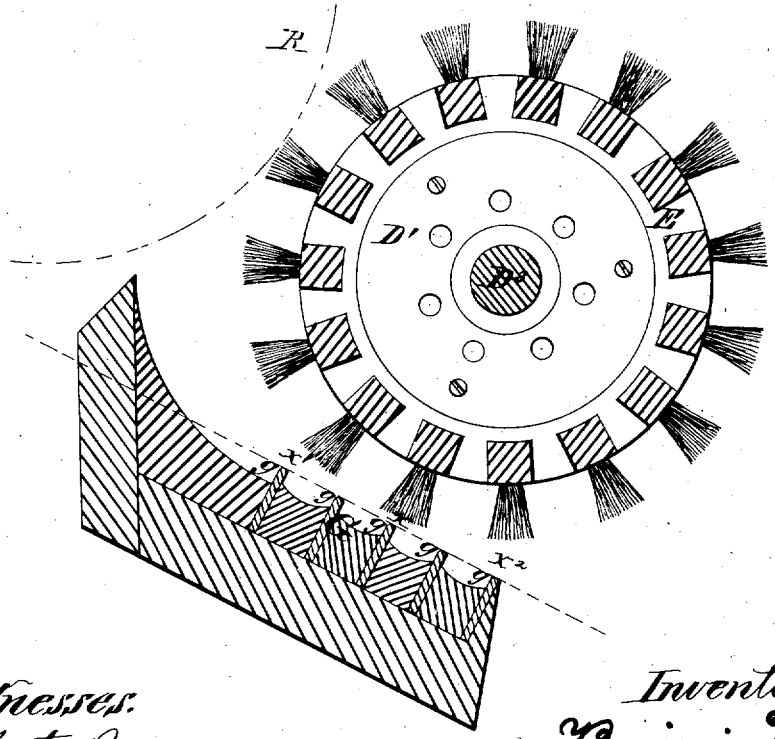

Figure 1, Plate 1, is a vertical longitudinal section of that portion of a gin improved by me; the section is at a right angle to the shafts of the saws and brush. Fig. 2, Plate 2, is a longitudinal section of the stripping-brush drum. Fig. 3, Plate 2, is an enlarged longitudinal section of a portion of the gin; the section is at a right angle to the shafts of the saw and brush-drum.

The nature of my invention consists, first, in the combination, with the saws and brush-cylinder of a cotton-gin, of a whipping-bed so arranged tangentially beneath the brush-cylinder as to conduct the cotton from the saws through a contracted and then into a divergent space forward of the mote-passage or mote-chamber, as and for the purpose presently set forth. It consists, second, in the arrangement of blades or their equivalents, and with relation to the brush-cylinder and saws of a cotton-gin, as and for the purpose presently set forth. It consists, third, in the combination of a tail-board or partition with the aforesaid tangential whipping-bed, the brush-cylinder, and the mote-chamber, as and for the purpose presently described.

A represents the frame of a cotton-gin, which is properly housed in; B, a portion of a feed-box or hopper of any approved construction, but preferably of the construction shown in the Letters Patent granted to me under a separate division of reissue on an even date with this reissue; S, the well-known ginning-saws; R, the ribbed breast through which the saws work. $R^2$ is the mote-board, and $R^3$ the mote-chamber; O, the mote-escape passage; N, a valve or slide for regulating the size of the mote-escape passage, and for entirely closing the same when desired. This valve moves in a groove or guide, *n*, of the frame. P is the lint flue or passage, which is in communication with the lint-room. D is the brush-cylinder, and G the tangential whipping-bed, arranged beneath the brush-cylinder and behind the saws, and in front of the mote-passage O. This bed, at its rear end, is provided with a partition or apron-board, G′, which extends across and down into the mote-chamber just in front of the mote-passage O, so as to prevent, to a great extent, the formation of eddies or currents of air, which would tend to hold up the motes about the passage O by the rapid revolution of the brush. The said bed G is so constructed and arranged that its front end extends up very nearly to the saws, and its whipping-surface is in such relation to the brush-cylinder that that part of its top which is the shortest distance from the drum-shaft forms a contracted space, $x \cdot x^1$, while those parts of said top or working surface which are forward of the part mentioned form an expanded or divergent space, $x\ x^2$, and these spaces are forward of the mote-passage O and mote-chamber. The whipping-passage just described is produced by making the whipping-surface of the bed tangential to the brush, as illustrated by the dotted line in Fig. 3 of the drawings. I have found it preferable to make the whipping-surface with narrow ribs, *g g*, arranged with their top edges in a plane; but as my invention of the contracted and expanded or divergent passage $x\ x^1\ x^2$ below the brush-cylinder and behind the saws, and forward of the mote passage or chamber, may be carried out in various ways without departing from the principle involved—viz., that of conducting the cotton on a line tangent to the brush-cylinder, and through a contracted and then a divergent passage forward of the mote-escape passage or chamber—I do not confine myself to the ribbed surface, although after repeated trials I have found it to answer the purpose very perfectly.

In the drawings, the brush-cylinder is shown constructed hollow, with slats, perforated end pieces, and a transverse perforated intermediate partition; but any other approved construction may be adopted, as I set up no specific claim for a construction of the brush-cylinder in a special manner. I however prefer to make said cylinder of slats, united to circular pieces E E E′, in which are perforations for the circulation of air, and over the perforations in the end pieces of the cylinder are placed thin metal plates $D^1$ $D^1$, which are finely reticulated, in order to admit air, and at the same time be rat-proof. The plates and the central circular piece E′ serve as the means by which to attach and support the brush-cylinder upon its shaft $D^3$, which rests on the frame of the gin.

The operation is as follows: The saws and stripping-brush cylinder being set in rapid motion, the cotton is ginned, as usual, by the saws S, and carried through the breast R, caught by the brushes of the cylinder, stripped from the saws, carried down into the converging space $x$ $x^1$, and violently whipped up and subjected to friction, which opens, loosens, and separates its motes, when it is forced into the diverging space $x$ $x^2$ and further whipped, but with a decreasing pressure or friction, being subjected to lifting, blowing, and separating actions. This done, the lint or light matter is blown into the lint-flue, and the dirt or motes and heavier matters thrown upon the inclined board N, and allowed to descend into the mote-chamber through passage O, which descent of the motes is ready and free, as the tail-board prevents the formation of currents of air about the mote-passage. The rapid rotation of the cylinder causes air to be drawn into it from without through the perforated end plates $D^1$, and this air is forced out through the spaces between the brush, slats, or rows of brushes, and by this means the accumulation of lint about and upon the brushes, as well as the entrance of loose cotton into the drum, is prevented, and at the same time the cotton is "opened up" in a great measure, and thus the separation of the motes and foreign substances therefrom by the subsequent whipping operation greatly facilitated.

When the gin is not in operation the lint-flue and the mote-passage are closed; and as the ends of the cylinder are closed and the whole housed in rat-proof, the brushes of the cylinder will be preserved from the ravages of these animals, which are attracted by the oil in the cotton, and destroy the brushes to get it, and thus it is not necessary, in order to save the brushes, to remove them from the gin-house.

The gist of my invention lies in this: First, the brush-cylinder strips the cotton from the saws, then whips it with an increasing friction, which prepares it for the opening-up and mote-separating process, and afterward with a decreasing friction at a point forward of the mote-passage, and during which latter action the cotton is opened up, and the motes and impurities expelled therefrom into the mote-chamber, and the cotton blown or carried over the mote-board $R^2$ into the lint-room.

What I claim as new is—

1. The combination, with the saws and brush-cylinder of a cotton-gin, of the whipping-bed G, arranged beneath the brush-cylinder, to conduct the cotton from the saws through a contracted and then a divergent space in front of the mote passage and chamber, substantially as and for the purpose specified.

2. The arrangement of the blades $g$, or their equivalent, with relation to the revolving brush of a saw-gin, substantially as described.

3. The combination of the partition or tail-board G′ with the whipping-bed G, mote-passage O, and revolving brush-cylinder, substantially as and for the purpose described.

BENJAMIN DAVID GULLETT.

Witnesses:

STEPHEN D. ELLIS,

BARRITT T. MILLICAN.